US012774003B2

(12) United States Patent
Choi

(10) Patent No.: US 12,774,003 B2
(45) Date of Patent: Oct. 27, 2026

(54) APPARATUS AND METHOD OF CONTROLLING VEHICULAR BRAKING

(71) Applicant: HYUNDAI MOBIS CO., LTD., Seoul (KR)

(72) Inventor: Moon Cheon Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 65 days.

(21) Appl. No.: 18/765,475

(22) Filed: Jul. 8, 2024

(65) Prior Publication Data

US 2025/0100565 A1 Mar. 27, 2025

(30) Foreign Application Priority Data

Sep. 25, 2023 (KR) ........................ 10-2023-0128252

(51) Int. Cl.

*B60W 50/02* (2012.01)
*B60W 10/08* (2006.01)
*B60W 10/192* (2012.01)
*B60W 50/029* (2012.01)

(52) U.S. Cl.

CPC ........ *B60W 50/0225* (2013.01); *B60W 10/08* (2013.01); *B60W 10/192* (2013.01); *B60W 50/029* (2013.01); *B60W 2510/244* (2013.01); *B60W 2520/00* (2013.01); *B60W 2540/12* (2013.01); *B60W 2710/083* (2013.01)

(58) Field of Classification Search

None

See application file for complete search history.

(56) References Cited

U.S. PATENT DOCUMENTS

| | | | | |
|---|---|---|---|---|
| 2014/0324283 | A1 | 10/2014 | Kim et al. | |
| 2017/0008401 | A1* | 1/2017 | Stemmer | B60T 1/10 |
| 2018/0154777 | A1* | 6/2018 | Hall | B60L 7/18 |
| 2023/0095519 | A1* | 3/2023 | Hoshi | B60L 58/12 701/22 |
| 2023/0278541 | A1* | 9/2023 | Shibata | B60W 30/18127 701/22 |

FOREIGN PATENT DOCUMENTS

| | | | |
|---|---|---|---|
| GB | 2472392 | A | 2/2011 |
| KR | 10-2009-0062321 | A | 6/2009 |

OTHER PUBLICATIONS

Extended European search report issued on Nov. 8, 2024, in counterpart European Patent Application No. 24175997.6 (10 pages).

* cited by examiner

*Primary Examiner* — Lail A Kleinman
(74) *Attorney, Agent, or Firm* — NSIP Law

(57) ABSTRACT

A method and apparatus for controlling braking of a vehicle are provided. The apparatus includes an in-wheel motor installed in a wheel to rotate the wheel, an electro-mechanical brake installed in the wheel to perform braking, a vehicular speed sensor to measure a speed of the vehicle, and a processor to: compute a required braking force, in response to receiving a signal initiated by a brake pedal; control braking by distributing the required braking force to the electro-mechanical brake and the in-wheel motor; determine a braking state according to a speed of the vehicle and recompute a braking torque for the in-wheel motor; and in case the electro-mechanical brake fails to operate, control the in-wheel motor to bring the vehicle to a stop.

16 Claims, 11 Drawing Sheets

APPARATUS AND METHOD OF CONTROLLING VEHICULAR BRAKING

CROSS-REFERENCE TO RELATED APPLICATION(S)

This application claims the benefit under 35 USC § 119 of Korean Patent Application No. 10-2023-0128252, filed on Sep. 25, 2023, in the Korean Intellectual Property Office, the entire disclosures of which are hereby incorporated by reference for all purposes.

BACKGROUND

1. Field

Exemplary embodiments relate to an apparatus for and a method of controlling vehicular braking, the apparatus and the method being capable of controlling braking of a vehicle having four wheels that operate independently.

2. Discussion of Related Art

In recent years, there has been a trend toward the development of vehicles, each having four wheels that all independently drive and brake and can independently steer.

In the vehicle having four wheels that independently operate, a drive apparatus (a motor) for driving the vehicle, a steering apparatus, and a brake are included in one wheel. Thus, the wheel independently drives and can control the direction of the vehicle.

The related art relating to a vehicle capable of independent drive and steering is disclosed in Korean Patent Application Publication No. 10-2009-0062321 (Independent drive and traveling system of in-wheel drive electric vehicle and method of controlling same)

However, in the case of the vehicle capable of independent drive and steering, each wheel can be controlled independently, but in a case where a brake fails to operate, this may cause a problem with vehicle braking.

Accordingly, there is a need to provide a method of braking the vehicle in a case where the brake fails to operate.

SUMMARY

Various embodiments of the present disclosure, which are contrived to address the above-mentioned problem, are directed to an apparatus for and a method of controlling vehicular braking, the apparatus and the method being capable of stably performing braking in response to the failure of a brake in a vehicle capable of four-wheel drive independent control.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, an apparatus for controlling braking a vehicle includes: an in-wheel motor installed in a wheel and configured to rotate the wheel; an electro-mechanical brake installed in the wheel and configured to perform braking; a vehicular speed sensor configured to measure a speed of the vehicle; and a processor configured to: compute a required braking force in response to receiving a signal initiated by a brake pedal; control braking by distributing the required braking force to the electro-mechanical brake and the in-wheel motor; determine a braking state according to the speed of the vehicle and recompute a braking torque for the in-wheel motor; and in case the electro-mechanical brake fails to operate, control the in-wheel motor to bring the vehicle to a stop.

The processor may be further configured to: when the signal is input from the brake pedal, check a state of charge (SOC) of a battery; in case the SOC of the battery is above a first setting value, control the electro-mechanical brake to perform the braking; and in case the SOC is at or below the first setting value, distribute the required braking force to the in-wheel motor and the electro-mechanical brake.

The processor may be further configured to: in case the electro-mechanical brake fails to operate, determine, according to the signal from the brake pedal, whether sudden braking is required; and when sudden braking is required, control the in-wheel motor to operate at maximum braking torque.

The processor may be further configured to: determine whether sudden braking is required when the electro-mechanical brake fails to operate; determine whether the vehicle is in a speed-reduced state when a sudden braking-required situation is not reached; maintain braking torque for the in-wheel motor when the vehicle is in the speed-reduced state; and recompute the braking torque for the in-wheel motor when the vehicle is not in the speed-reduced state.

The processor may be further configured to: stop the braking that uses the in-wheel motor when the speed of the vehicle is lower than a preset speed; and perform the braking by controlling rear wheels of the vehicle in a toe-in configuration manner.

The processor may be further configured to disperse and distribute the braking force to a plurality of the in-wheel motors and a plurality of the electro-mechanical brakes, based on the required braking force.

The processor may be further configured to, in a case the brake signal is input and the SOC is above the first setting value, control the electro-mechanical brake to perform braking without controlling the in-wheel motor to perform braking.

The processor may be further configured to control the in-wheel motor to generate reverse torque to perform braking.

In another general aspect of the disclosure, A processor-implemented method of controlling braking of a vehicle, includes: computing a required braking force in response to receiving a signal initiated a brake pedal; controlling braking by distributing the required braking force to an electro-mechanical brake and an in-wheel motor; determining a braking state according to a speed of the vehicle in case the electro-mechanical brake fails to operate; and controlling the in-wheel motor by recomputing braking torque for the in-wheel motor according to the braking state.

The controlling of the braking may include: controlling the braking using the electro-mechanical brake in case a state of charge (SOC) of a battery is above a first setting value, after checking the SOC of the battery when the signal is input from the brake pedal; and controlling the braking by distributing the required braking force to the in-wheel motor and the electro-mechanical brake in case the SOC of the battery is at or below the first setting value.

The determining of the braking state may include: determining, according to the signal from the brake pedal, whether sudden braking is required, in case the electro-mechanical brake fails to operate; controlling the in-wheel motor to operate at a maximum braking torque when sudden braking is required; and determining whether the vehicle is in a speed-reduced state when sudden braking is not required.

The determining of whether the vehicle is in the speed-reduced state may include: maintaining braking torque for the in-wheel motor when the vehicle is in the speed-reduced state; and recomputing the braking torque for the in-wheel motor when the vehicle is not in the speed-reduced state.

The method may further include: stopping the braking that uses the in-wheel motor when the speed of the vehicle is below a preset speed; and performing the braking by controlling rear wheels of the vehicle in a toe-in configuration manner.

The method may further include: dispersing and distributing the braking force to a plurality of the in-wheel motors and a plurality of the electro-mechanical brakes, based on the required braking force.

The method may further include: in case the brake signal is input and the SOC is above the first setting value, controlling the electro-mechanical brake to perform braking without controlling the in-wheel motor to perform braking.

The method may further include: controlling the in-wheel motor to generate reverse torque to perform braking.

The apparatus for and the method of controlling vehicular braking according to the embodiments of the present disclosure can perform the braking using the in-wheel motor and the steering apparatus in a vehicle having four wheels that independently drive and steer. Thus, although the brake fails to operate, the apparatus and the method can safely bring the vehicle to a stop.

The apparatus for and the method of controlling vehicular braking according to the embodiments of the present disclosure can effectively perform the braking according to a situation, thereby increasing the reliability.

DETAILED DESCRIPTION

Figure 1:
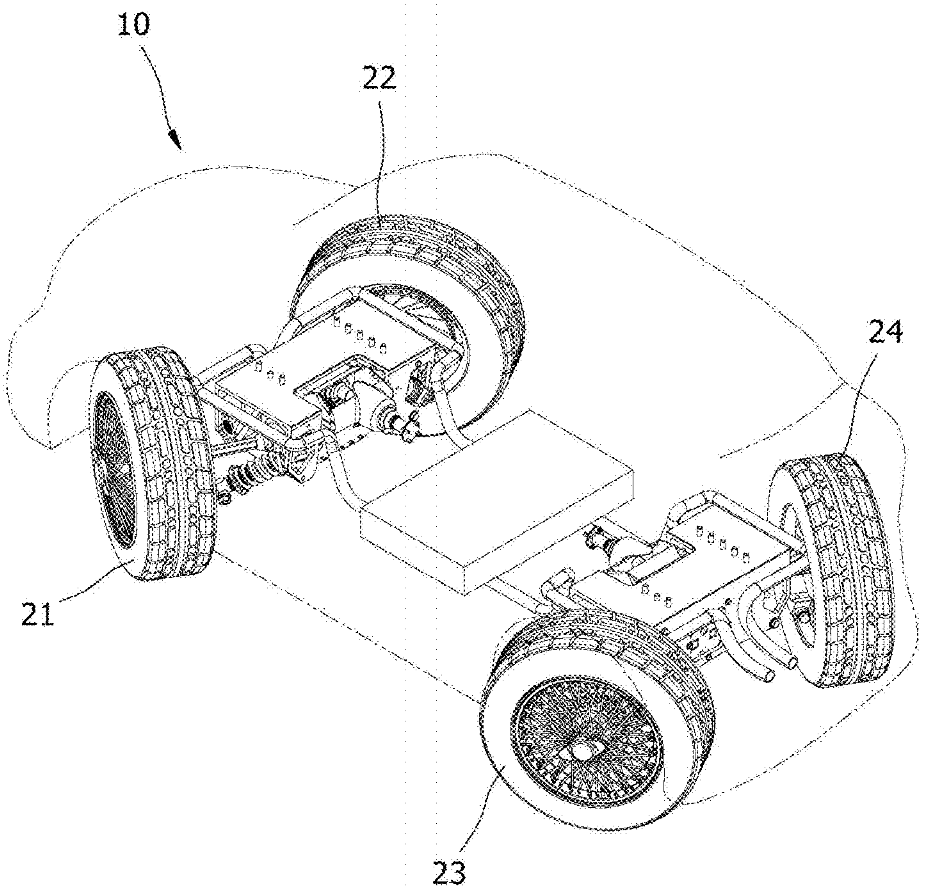
FIG. 1 is a view schematically illustrating a configuration of a four-wheel drive independent control vehicle in which an embodiment of the present disclosure in which finds application.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

The present disclosure will be described below with reference to the accompanying drawings.

FIG. 1 is a view schematically illustrating a configuration of a four-wheel drive independent control vehicle 10 in which an embodiment of the present disclosure finds application.

As illustrated in FIG. 1, the vehicle 10 has four wheels 21 to 24 that can operate independently.

The vehicle 10 includes a drive apparatus (an in-wheel motor) for driving, a steering apparatus, and a braking apparatus (a brake) in each wheel. These apparatuses independently drive and brake and can control the direction of the vehicle 10.

The vehicle 10 can independently control four wheels 21 to 24 and thus can rotate in place or move horizontally in the axial direction.

These independent control capabilities enable the vehicle 10 to provide various types of mobility that are distinct from existing types of mobility.

For example, the purpose-built vehicle (PBV), a purpose-built mobility solution, has been developed with diverse implementation approaches as an innovative transportation solution for the purpose of prioritizing mobility and utility over a mere transportation solution.

Figure 2:
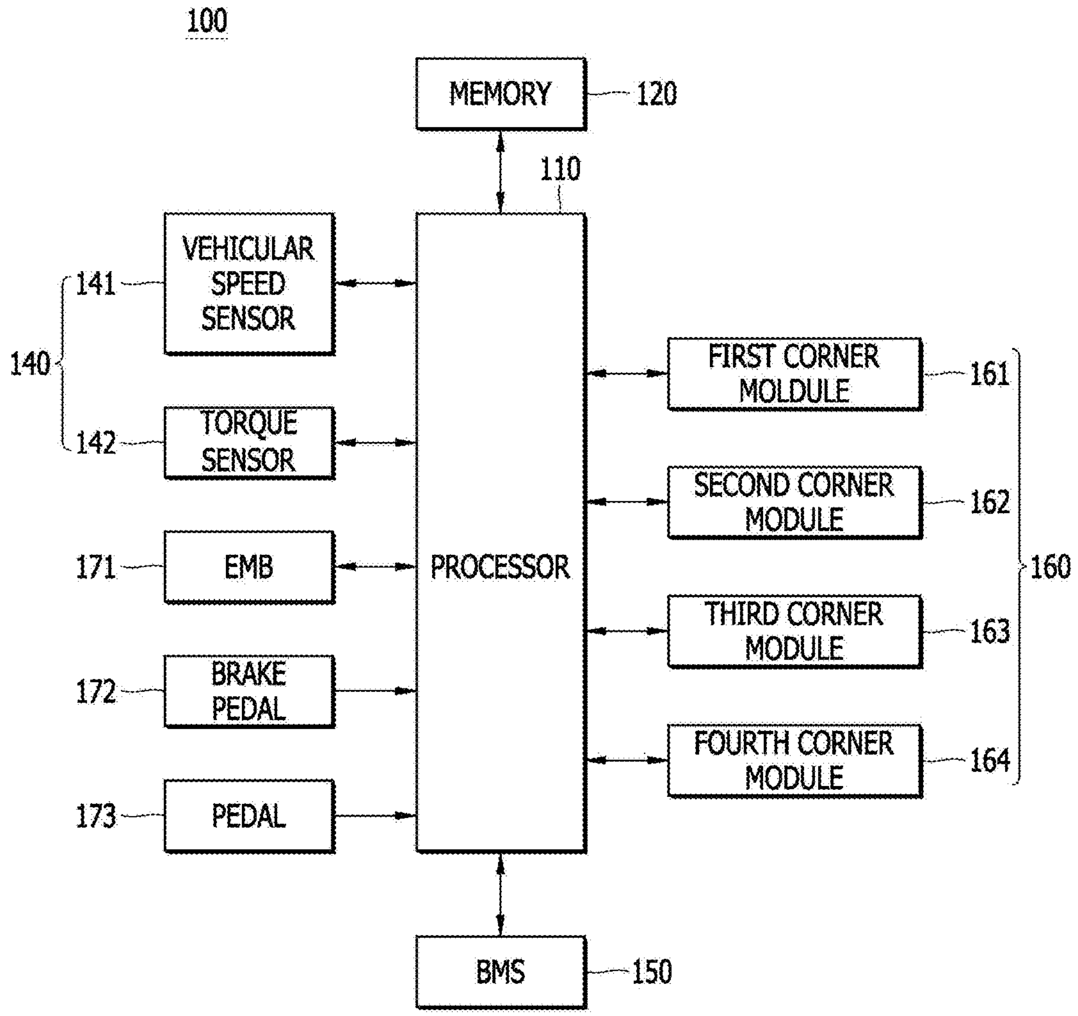
FIG. 2 is a block diagram schematically illustrating a configuration of an apparatus for controlling vehicular braking according to a first embodiment of the present disclosure.

FIG. 2 is a block diagram schematically illustrating a configuration of an apparatus 100 for controlling vehicular braking according to a first embodiment of the present disclosure.

As illustrated in FIG. 2, the apparatus 100 for controlling vehicular braking according to the present disclosure may include a memory 120, a sensor 140, an electro-mechanical brake (EMB) 170, a brake pedal 190, a battery management system (BMS) 150, an in-wheel module 160 for four wheels, and a processor 110.

The apparatus 100 for controlling vehicular braking may further include a communication unit (not illustrated) for communication within the vehicle 10 and communication with the outside. For example, the communication unit can transmit and receive data within the vehicle 10 using CAN communication or LIN communication. Furthermore, the communication unit can transmit and receive data to and from the outside using communication standards such as vehicle-to-vehicle (V2V) communication, Ethernet, WiFi, and Bluetooth.

The sensor 140 may include a vehicular speed sensor 141 and a torque sensor 142. The sensor 140 may further include a motor angle sensor, a steering angle sensor, a brake pedal sensor, a voltage sensor, a current sensor, and a temperature sensor, among other sensors, and descriptions thereof are omitted.

The vehicular speed sensor 141 detects a traveling speed of the vehicle 10.

The torque sensor 142 measures braking force acting on each wheel.

The battery management system (BMS) 150 controls a battery in such a manner that the battery is charged or that an output of the battery is supplied to the processor 110 and the in-wheel module 160. In addition, the battery management system (BMS) 150 can check a state of charge (SOC) of the battery (not illustrated) and can detect a failure of the battery.

Stored in the memory 120 can be data for traveling, driving, braking, and braking of the vehicle 10, data measured from the sensor 140, and state data of the battery. In addition, stored in the memory 120 can be data for the in-wheel module 160.

Stored in the memory 120 can be at least one of the following algorithms: a steering control algorithm, a drive control algorithm, a braking control algorithm, or a traveling control algorithm.

Examples of the memory 120 may include nonvolatile memories, such as a random access memory (RAM), a ROM, electrically erased programmable ROM (EEPROM), and a flash memory, and other memory devices.

The electro-mechanical brake (EMB) 170 applies braking torque to the wheel, according to the braking force computed by converting force acting on the brake pedal 190 into an electrical signal, and thus performs braking. In addition, the electro-mechanical brake (EMB) 170 may include a button and a switch. The electro-mechanical brakes (EMBs) 170 can transfer the braking force to the four wheels 21 to 24, respectively, based on a signal that is input by operating the button or the switch.

The electro-mechanical brakes (EMBs) 170 are provided on the four wheels 21 to 24, respectively, and can independently brake the four wheels 21 to 24.

The electro-mechanical brake (EMB) 170 can control a posture of the vehicle 10 by integrally controlling ABS, TCS, BAS, and electronic stability program (ESP) functions.

In a case where the brake pedal 190 is operated by a driver, the brake pedal 190 changes and applies a signal according to the degree of operation (pushing). The vehicle 10 operates the electro-mechanical brakes (EMBs) 170 according to the signal of the brake pedal 190, thereby reducing a speed of the vehicle 10 or bringing the vehicle 10 to a stop.

The in-wheel module 160 is installed in the four wheels 21 to 24 and may include drive apparatuses, braking apparatuses, suspensions, and steering apparatuses. In this case, the drive apparatus is an in-wheel motor 180, and the braking apparatus is an electronic-mechanical brake (EMB).

The in-wheel module 160 drives the in-wheel motors 180 of the four wheels 21 to 24 according to a control signal applied from the processor 110, thereby enabling the vehicle 10 to travel. The in-wheel module 160 can reduce the speed of the vehicle 10 by controlling the electronic-mechanical brakes (EMBs) 170. The in-wheel module 160 can control the directions of the four wheels 21 to 24 through the steering apparatuses.

The in-wheel module 160 can brake the vehicle 10 through the electro-mechanical brakes (EMBs) 170. In addition, the in-wheel module 160 can brake the vehicle 10 by controlling the in-wheel motors 180 and thus generating reverse torque.

The in-wheel module 160 includes first to fourth in-wheel modules 161 to 164, which are installed in the four wheels 21 to 24, respectively.

The in-wheel motors 180 are installed in first to fourth in-wheel modules 161 to 164, respectively. The electro-mechanical brakes (EMBs) 170 may be installed in the first to fourth in-wheel modules 161 to 164, respectively.

The first in-wheel module 161 is installed in a front left wheel, the second in-wheel module 162 in a front right wheel, the third in-wheel module 163 in a rear left wheel, and the fourth in-wheel module 164 in a rear right wheel.

The processor 110 may include at least one micro-processor and can operate based on the algorithm stored in the memory 120.

The processor 110 can determine a traveling state of the vehicle 10 based on the SOC of the battery and on data that are input from the sensor 140.

The processor 110 computes required braking force according to the degree of operation of the brake pedal 190. The processor 110 performs braking by controlling the in-wheel motors 180 and the electro-mechanical brakes (EMBs) 170, thereby enabling the vehicle 10 to reduce the speed thereof and to bring the vehicle 10 to a stop.

The processor 110 computes the required braking force in response to operation of the brake pedal 190 or a brake key (not illustrated). Then, the processor 11 distributes the control signal to the electro-mechanical brake (EMB) 170 and to at least one of the first to fourth in-wheel modules 161 to 164, thereby correspondingly applying the control signal.

In addition, the processor 110 can distribute the braking force based on the speed of the vehicle 10 and the SOC of the battery.

The processor 110 can check the traveling state of the vehicle 10 and the SOC of the battery. Correspondingly, the processor 110 can compute drive force and the braking force that are to be applied to the first to fourth in-wheel modules 161 to 164, respectively, mounted on the vehicle 10 based on at least one of restricted output values of the battery and can apply the computed drive force and braking force to the first to fourth in-wheel modules 161 to 164.

Accordingly, the in-wheel motors 180 can operate according to the respectively applied control signals, thereby applying the braking force to the four wheels 21 to 24. In addition, the in-wheel motors 180 can generate the reverse torque, thereby performing braking.

During braking, the processor 110 can check whether or not the electro-mechanical brake (EMB) 170 operates normally and can detect a failure thereof.

In a situation where the electro-mechanical brake (EMB) fails to operate, the processor 110 can determine whether or not sudden braking is required, and, if necessary, can control braking by redistributing the braking force.

In a case where the electro-mechanical brake (EMB) 170 fails to operate, the processor 110 can perform braking by generating the reverse torque through the in-wheel motor 180.

In addition, the processor 110 can recompute and distribute the braking force according to a state of the vehicle 10, for example, according to whether or not the speed of the vehicle 10, which is measured from the vehicular speed sensor 141, decreases or increases. Then, the processor 110 can apply the control signal to each of the first to fourth in-wheel modules 161 to 164.

In a case where the electro-mechanical brake (EMB) 170 fails to operate, the processor 110 can output a warning against a brake failure through a display (not illustrated), such as an instrument panel.

Figure 3:
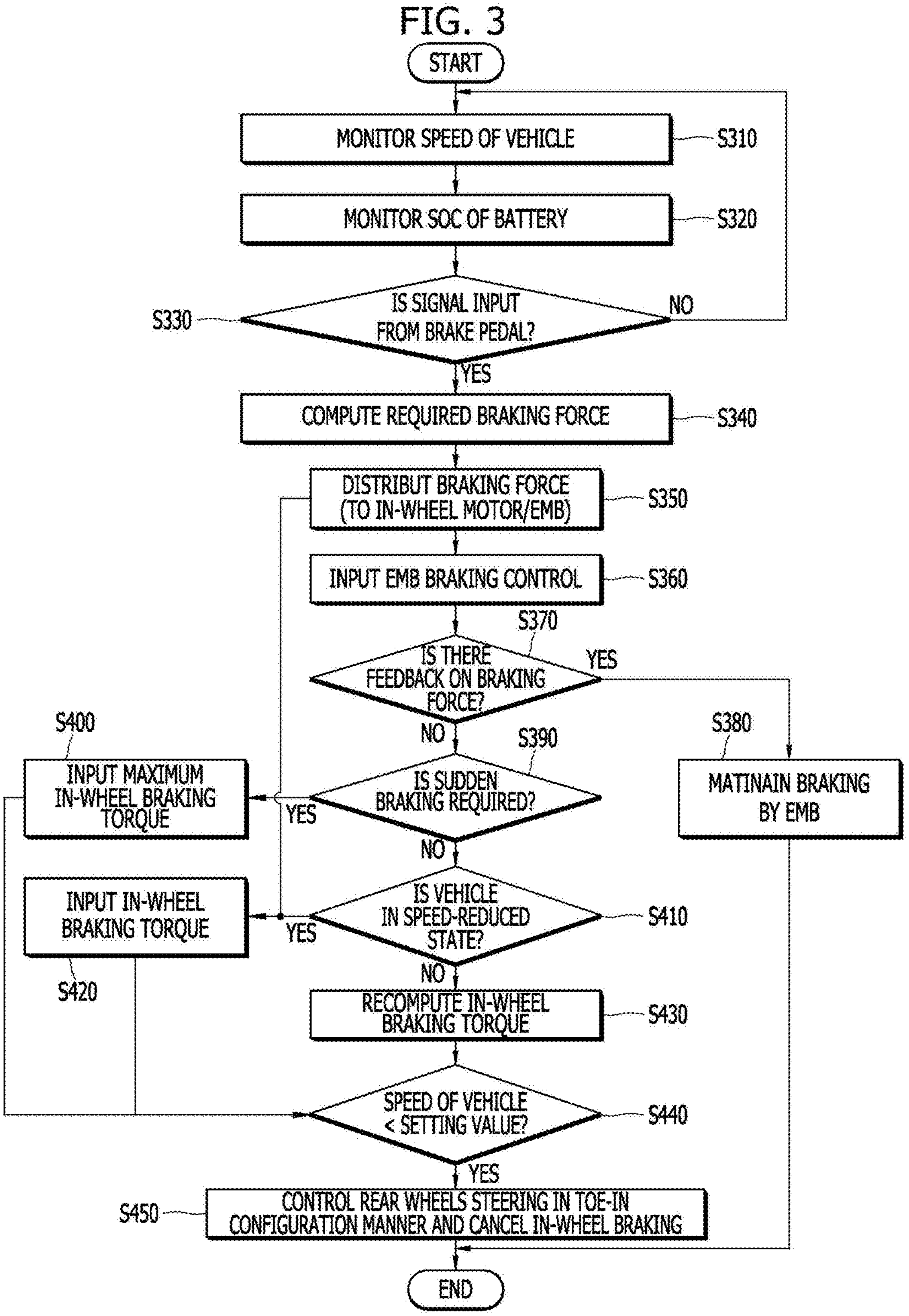
FIG. 3 is a flowchart illustrating a method of controlling vehicular braking according to a second embodiment of the present disclosure.

FIG. 3 is a flowchart illustrating a method of controlling vehicular braking according to a second embodiment of the present disclosure.

As illustrated in FIG. 3, the apparatus 100 for controlling vehicular braking monitors the traveling state of the vehicle 10 and the SOC of the battery. When a brake-required situation occurs, the apparatus 100 for controlling vehicular braking controls the vehicle 10 in such a manner as to reduce the speed thereof and to bring the vehicle 10 to a stop.

While the vehicle 10 travels, the processor 110 receives vehicular speed information from the vehicular speed sensor 141 (S310), and receives SOC information from the battery management system (BMS) 150, thereby monitoring the SOC of the battery (S320).

When a signal is input from the brake pedal 190 (S330), the processor 110 computes the required braking force (S340).

The processor 110 disperses and distributes the braking force to a plurality of the in-wheel motors 180 and the electro-mechanical brakes (EMB) 170 based on the required braking force (S350).

The electro-mechanical brakes (EMB) 170 operate according to the respective distributed braking force, thereby braking the vehicle 10. In addition, the in-wheel motors 180 operate according to the respective distributed braking force and perform barking control in such a manner as to generate the reverse torque.

At this point, the processor 110 receives, as input, feedback from the electro-mechanical brake (EMB) 170, and thus can check a state of the electro-mechanical brake (EMB) 170 and whether or not to brake the vehicle 10.

The processor 110 determines whether or not the feedback is received from the electro-mechanical brake (EMB) 170 (S370). In a case where the feedback is received, the processor 110 maintains the braking by the electro-mechanical brake (EMB) 170 (S380).

In a case where the feedback is not received, the processor 110 can determine that a problem occurs with the electro-mechanical brake (EMB) 170 or that the electro-mechanical brake (EMB) 170 fails to operate.

In a case where the electro-mechanical brake (EMB) 170 fails to operate, the processor 110 determines that a current braking-required situation corresponds to sudden braking (S390).

In a case where the current braking-required situation corresponds to sudden braking, the processor 110 controls the in-wheel motor 180 by setting the in-wheel motor 180 to maximum braking torque (S400). Accordingly, the in-wheel motor 180 performs braking by maximally generating the reverse torque.

In a case where the current braking-required situation does not correspond to sudden braking, the processor 110 determines, according to the vehicular speed information being input from the vehicular speed sensor 141, whether or not the vehicle 10 is currently in a speed-reduced state (S410).

In a case where the vehicle 10 is currently in the speed-reduced state, the processor 110 keeps the braking torque against the in-wheel motor 180 at a current value (S420).

In a case where the vehicle 10 is not currently in the speed-reduced state, the processor 110 recomputes the braking torque against the in-wheel motor 180, thereby correspondingly applying the control signal to the in-wheel motors 180 (S430).

When a current speed of the vehicle 10 decreases below a preset value due to a braking control-caused decrease in the speed of the vehicle 10 (S440), the processor 110 causes the in-wheel motor 180 to cancel braking and performs braking by steering the rear wheels 23 and 24 in such a manner as to attain a toe-in state (S450).

When the electro-mechanical brake (EMB) 170 fails to operate, the processor 110 generates and outputs a warning against this failure, and controls the vehicle 10 by performing braking in such a manner as to bring the vehicle 10 to a stop.

The operation of the vehicular braking apparatus 100 is described in detail as follows.

Figure 4:
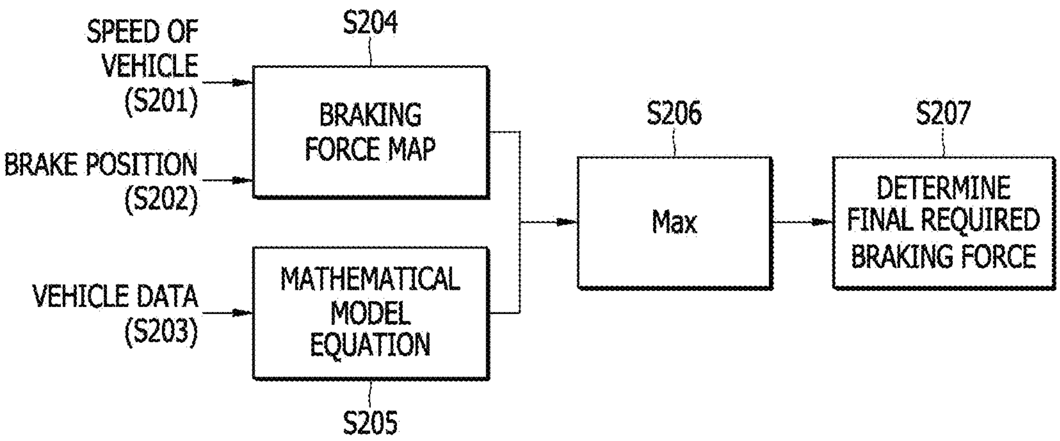
FIG. 4 is a flowchart illustrating the flow of data that occurs when the apparatus for controlling vehicular braking computes braking force, in the method according to the second embodiment of the present disclosure.

FIG. 4 is a flowchart illustrating the flow of data that occurs when the apparatus 100 for controlling vehicular braking computes the braking force, in the method according to the second embodiment of the present disclosure.

With reference to FIG. 4, in a case where the driver operates the brake pedal 190, the processor 110 receives, as input, the speed of the vehicle 10 (refer to S201), a brake position (the degree of operation) of the brake pedal 190 (refer to S202), and vehicular data (refer to S203), and computes the required braking force. At this point, the vehicular data (refer to S203) include an acceleration in the vertical direction and the mass of the vehicular 10.

The processor 110 refers to a braking force map MAP based on the speed of the vehicle (refer to S201) and on the brake position (refer to S202), among the data being input (S204), and compares the computed braking force against a mathematical model, which varies with the vehicular data (refer to S203) (S205).

As a result of the comparison, the processor 110 computes a maximum value MAX from the braking force according to the result of the comparison (S206), and finally determines the required braking force (S207).

The processor 110 sets a maximum braking force as the required braking force, thereby distributing the braking force.

Figure 5:
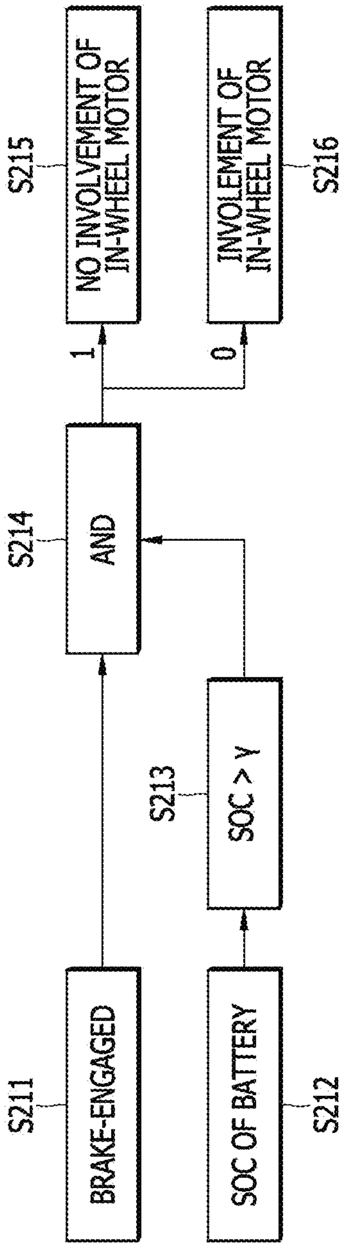
FIG. 5 is a flowchart illustrating the flow of data that occurs when the apparatus for controlling vehicular braking monitors a battery, in the method according to the second embodiment of the present disclosure.

FIG. 5 is a flowchart illustrating the flow of data that occurs when the apparatus 100 for controlling vehicular braking monitors the battery, in the method according to the second embodiment of the present disclosure.

With reference to FIG. 5, the processor 110 receives, as input, the SOC from the battery management system (BMS) 150 and can determine according to a state of the battery whether or not to perform the braking control using the in-wheel motors 180.

The processor 110 receives, as input, a braking signal resulting from the operation of the brake pedal 190 (S211) and receives, as input, the SOC of the battery from the battery management system (BMS) 150 (S212).

The processor 110 compares the SOC of the battery against a first setting value γ (S213).

In a case where the brake signal is input and where the SOC of the battery is above the first setting value γ (S214), the processor 110 causes the in-wheel motor 180 not to be subject to the braking control (S215).

In a case where the SOC of the battery is so sufficient as to be at or above the first setting value γ, the processor 110 can perform braking using the electro-mechanical brake (EMB) 170 without the in-wheel motor 180 being involved.

In a case where the SOC of the battery is below the first setting value γ, the processor 110 performs the braking control with the in-wheel motor 180 being involved (S216).

The processor 110 controls braking by distributing the computed required braking force to the in-wheel motor 180 and the electro-mechanical brakes (EMB) 170.

Figure 6:
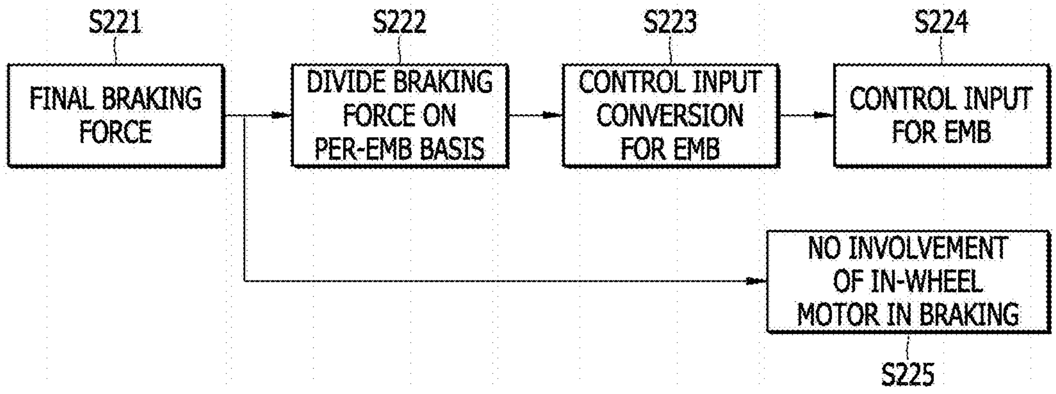
FIG. 6 is a flowchart illustrating the flow of data that occurs when the apparatus for controlling vehicular braking distributes the braking force, in the method according to the second embodiment of the present disclosure.

FIG. 6 is a flowchart illustrating the flow of data that occurs when the apparatus 100 for controlling vehicular braking distributes the braking force, in the method according to the second embodiment of the present disclosure.

With reference to FIG. 6, the processor 110 can control braking without using the in-wheel motor 180.

The processor 110 sets a distribution ratio of the required braking force computed in FIG. 4, that is, a distribution ratio of the final braking force (refer to S221) on a per-mechanical brake (EMB) 170 basis and divides the braking force (S222).

The electro-mechanical brakes (EMBs) 170 are provided in the four wheels 21 to 24, respectively, thereby independently braking the four wheels 21 to 24.

As illustrated in FIG. 5, in a case where the SOC of the battery is at or above the first setting value γ, the processor 110 does not use the in-wheel motor 180 (S225), and instead, performs braking through the electro-mechanical brake (EMB) 170.

The processor 110 distributes the braking force to the electro-mechanical brakes (EMBs) 170 provided in the four wheels 21 to 24, respectively, according to the distribution ratio. The processor 110 applies the control signal in such a manner that the electro-mechanical brakes (EMBs) 170 individually perform braking.

Accordingly, the electro-mechanical brakes (EMBs) 170 operate according to the respective received control signal (S223) and apply predetermined braking force to the four wheels 21 to 24, respectively, thereby performing braking (S224).

Figure 7:
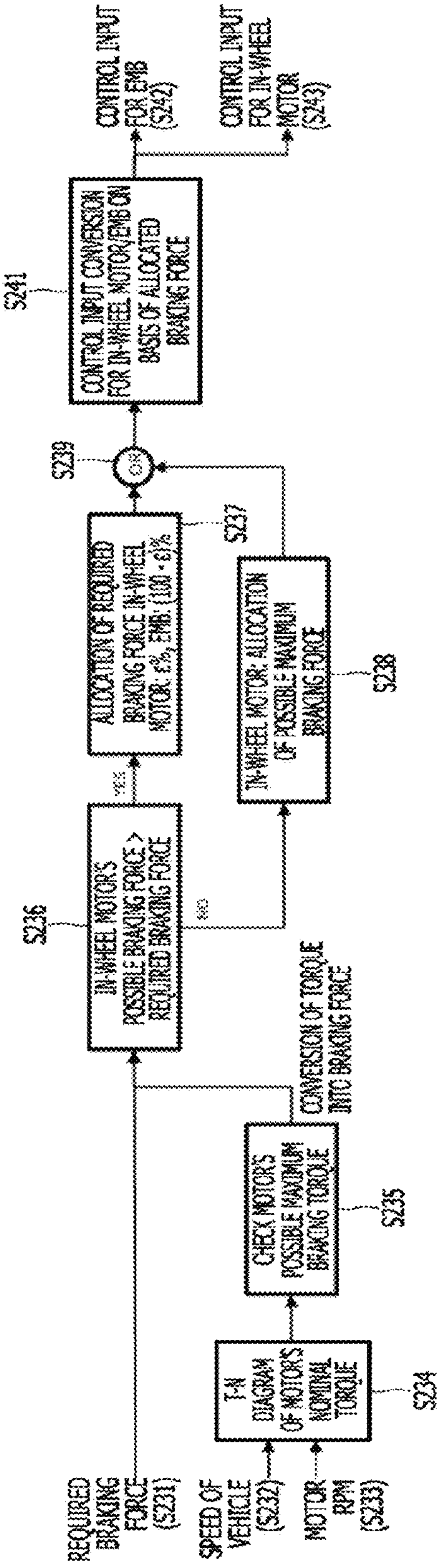
FIG. 7 is a flowchart illustrating the flow of data that occurs when the apparatus for controlling vehicular braking distributes the braking force, with an in-wheel motor being involved, in the method according to the second embodiment of the present disclosure.

FIG. 7 is a flowchart illustrating the flow of data that occurs when the apparatus 100 for controlling vehicular braking distributes the braking force, with the in-wheel motor 180 of being involved, in the method according to the second embodiment of the present disclosure.

With reference to 7, the processor 110 can control braking using the in-wheel module 160. The processor 110 can control barking by distributing the braking force to the in-wheel motor 180 and the electro-mechanical brake (EMB) 170.

In a case where the processor 110 performs braking using the in-wheel motor 180 according to the SOC of the battery, the processor 110 computes a T-N (torque vs. RPM) diagram of a motor's nominal torque based on the speed of the vehicle 10 (refer to S232) and a motor's rotational speed (RPM) (refer to S233) (S234), and checks a motor's possible maximum torque based on the computed diagram (S235). The processor 110 converts the possible maximum torque into the braking force of the in-wheel motor 180.

The processor 110 compares the previously computed required braking force (refer to S231) and the braking force (the braking force of the in-wheel motor 180), which results from the conversion from the possible maximum torque (S236).

In a case where the braking force of the in-wheel motor 180 is greater than the required braking force, the processor 110 distributes the required braking force according to a preset distribution ratio ε% (S237). The processor 110 distributes the braking force, obtained by multiplying the required braking force by the preset distribution ratio ε%, to the in-wheel motor 180. The processor 110 distributes the braking force, obtained by the required braking force by (100—the preset distribution ratio ε %), to the electro-mechanical brake (EMB) 170.

For example, when the distribution ratio is 60%, the processor 110 distributes 60% of the required braking force to the in-wheel motor 180 and distributes 40% of the required braking force to the electro-mechanical brake (EMB) 170, and then can correspondingly perform braking.

Because there is a possibility that the braking by the in-wheel motor 180 will fail, the processor 110 may distribute the required braking force to the electro-mechanical brake (EMB) 170.

In a case where the braking force of the in-wheel motor 180 is equal to or smaller than the required braking force, the processor 110 may distribute the braking force, corresponding to the maximum braking force of the in-wheel motor 180, to the in-wheel motor 180, and may distribute the braking force obtained by subtracting the maximum braking force from the required braking force to the electro-mechanical brake (EMB) 170 (S238).

That is, when the maximum braking force of the in-wheel motor 180 is 70%, the processor 110 is set to distribute 70% of the required braking force to the in-wheel motor 180 and to distribute 30% of the required braking force to the electro-mechanical brake (EMB) 170, thereby correspondingly performing braking.

Based on the preset distribution ratio and the distribution ratio, which is dependent on the maximum braking force (S239), the processor 110 switches to control input for the in-wheel motor 180 and the electro-mechanical brake (EMB) 170 (S241).

The processor 110 controls each of the electro-mechanical brakes (EMBs) 170 according to a designated distribution ratio (S242). In addition, the processor 110 controls each of the in-wheel motors 180 according to the designated distribution ratio (S243).

Figure 8:
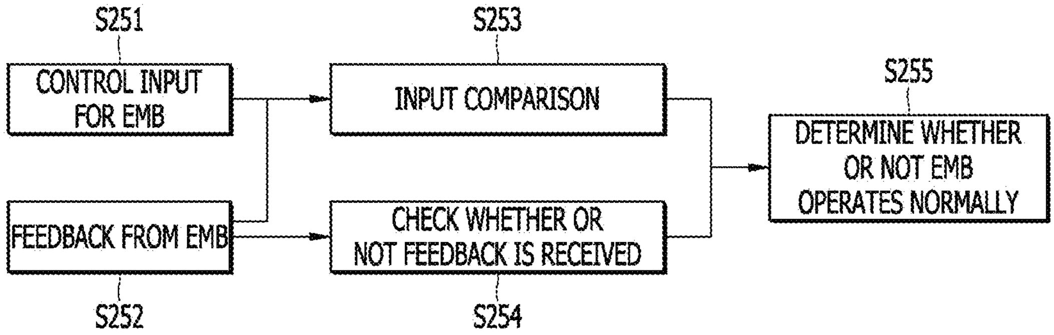
FIG. 8 is a flowchart illustrating the flow of data that occurs when the apparatus for controlling vehicular braking determines, through feedback on the braking force, that a brake operates abnormally, in the method according to the second embodiment of the present disclosure.

FIG. 8 is a flowchart illustrating the flow of data that occurs when the apparatus 100 for controlling vehicular braking determines, through feedback on the braking force, that the brake operates abnormally, in the method according to the second embodiment of the present disclosure.

With reference to FIG. 8, when distributing the required braking force and controlling the electro-mechanical brake (EMB) 170 (S251), the processor 110 receives the feedback from the electro-mechanical brake (EMB) 170 and thus checks the braking force (S252).

The vehicle 10, capable of independently controlling four wheels, does not have hydraulic stop and connection apparatuses, unlike the existing vehicle. There is a probability that braking will not function normally due to communication and power supply issues. To address this problem, the processor 110 can verify, through feedback, whether or not braking functions normally.

In a case where an input-to-reception ratio of feedback is lower than a reference setting ratio α % (S253), or in a case where the feedback signal is not received (S254), the processor 110 determines that the electro-mechanical brake (EMB) 170 fails to operate (S255).

When it is determined that the electro-mechanical brake (EMB) 170 operates normally, the processor 110 maintains exiting control input. When it is determined that the electro-mechanical brake (EMB) 170 fails to operate, the processor 110 proceeds to the next step.

Figure 9:
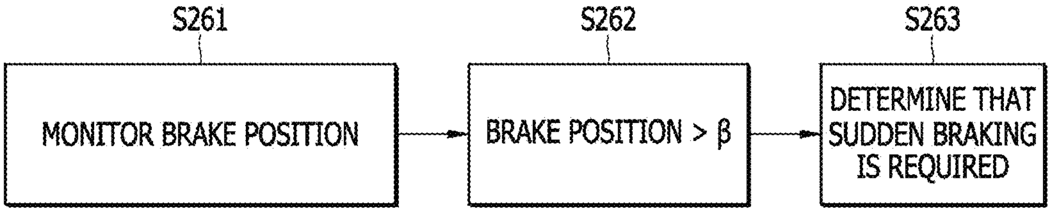
FIG. 9 is a flowchart illustrating the flow of data that occurs when the apparatus for controlling vehicular braking determines sudden braking, in the method according to the second embodiment of the present disclosure.

FIG. 9 is a flowchart illustrating the flow of data that occurs when the apparatus 100 for controlling vehicular braking determines sudden braking, in the method according to the second embodiment of the present disclosure.

With reference to FIG. 9, when it is determined that the electro-mechanical brake (EMBs) 170 fails to operate, the processor 110 determines whether or not sudden braking is required.

The processor 110 monitors a brake position (S261).

The processor 110 compares the brake position with a setting position β. In a case where the brake position is greater than the setting position β (S262), the processor 110 determines that sudden braking is required (S263).

For example, normal braking is performed when the brake position is at approximately 50%. However, when sudden braking is required, the brake position may be at or above 90%.

When an obstacle is present ahead in the vehicle's traveling or when a traffic light turns red, the driver brings the vehicle 10 to a sudden stop by operating the brake. In addition, even in a situation where the vehicle 10 is allowed to come to a slow stop, the driver may operate the brake pedal 190 to 90%.

Therefore, the processor 110 can determine a sudden braking-required situation by understanding the driver's intention to perform sudden braking, and thus can control braking. The processor 110 cannot only determine the position (the degree of operation) of the brake pedal 190 but can also determine the sudden braking-required situation according to a rate of change per time.

When the sudden braking-required situation is determined, the processor 110 controls the in-wheel motor 180 using current possible maximum braking torque of the in-wheel motor 180.

Figure 10:
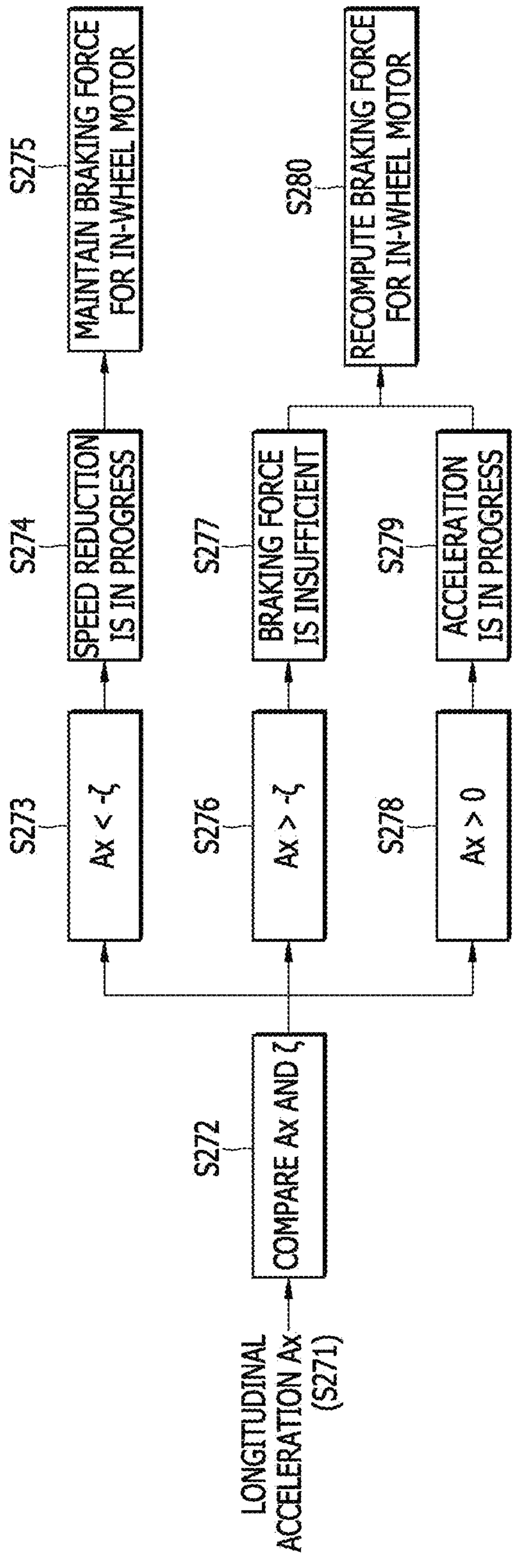
FIG. 10 is a flowchart illustrating the flow of data that occurs when the apparatus for controlling vehicular braking determines a speed-reduced state, in the method according to the second embodiment of the present disclosure.

FIG. 10 is a flowchart illustrating the flow of data that occurs when the apparatus 100 for controlling vehicular braking determines the speed-reduced state, in the method according to the second embodiment of the present disclosure.

With reference to FIG. 10, in a state where the electro-mechanical brake (EMB) 170 fails to operate, in a case where the sudden braking-required situation is not reached, the processor 110 does not control the in-wheel motor 180 using maximum available braking torque, and determines in-wheel braking input after determining whether or not the speed of the vehicle 10 is in the speed-reduced state.

The processor 110 uses longitudinal acceleration Ax in order to determine whether or not the speed of the vehicle 10 is in the speed-reduced state.

Based on the longitudinal acceleration Ax (S271), the processor 110 compares longitudinal acceleration Ax with a second setting value $-\zeta$ (S272). At this point, minus longitudinal acceleration Ax represents the speed-reduced state, and plus longitudinal acceleration Ax represents a state of acceleration.

In a case where, as a result of the comparison of the longitudinal acceleration Ax with the second setting value $-\zeta$, the longitudinal acceleration Ax is lower than the second setting value $-\zeta$ (S273), the processor 110 determines that speed reduction is in progress (S274), and maintains in-wheel braking force (S275).

The processor 110 determines that, in a state where the electro-mechanical brake (EMB) 170 fails to operate, the braking force acts normally through the in-wheel braking force, and maintains the in-wheel braking force.

In a case where the longitudinal acceleration Ax is higher than the second setting value $-\zeta$ (S276), the processor 110 determines that the braking is insufficient (S277) and recomputes the in-wheel braking force (S280).

In a case where the longitudinal acceleration Ax is higher than 0 (S278), the processor 110 determines that acceleration is in progress (S279), and recomputes the in-wheel braking force (S280). For example, in a case where the braking force is insufficient while the vehicle 10 travels on a downhill slope, the vehicle may be in the state of acceleration.

Figure 11:
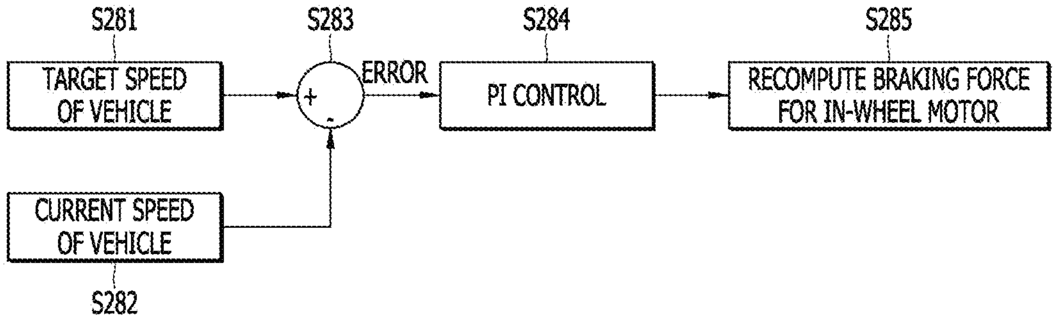
FIG. 11 is a flowchart illustrating the flow of data that occurs when the apparatus for controlling vehicular braking recomputes in-wheel braking torque, in the method according to the second embodiment of the present disclosure.

FIG. 11 is a flowchart illustrating the flow of data occurs when the apparatus for controlling vehicular braking recomputes the in-wheel braking torque, in the method according to the second embodiment of the present disclosure.

With reference to FIG. 11, in a case where the braking force is insufficient or where the acceleration is in progress, the processor 110 determines that current in-wheel braking input does not act on braking, and recomputes the in-wheel braking force.

The processor 110 can compute a difference between a target speed of the vehicle 10 (refer to S281) and the current speed of the vehicle 10 (refer to S282) (S283), can perform PI control based on the difference (S284), and can recompute the in-wheel braking torque (S285).

When the electro-mechanical brake (EMB) 170 fails to operate, the target speed of the vehicle 10 is 0.

The processor 110 can compute the in-wheel braking force based on the difference between the target speed of the vehicle 10 and the current speed of the vehicle 10 and can increase the braking force in such a manner that vehicle 10 reduces the speed thereof.

Figure 12:
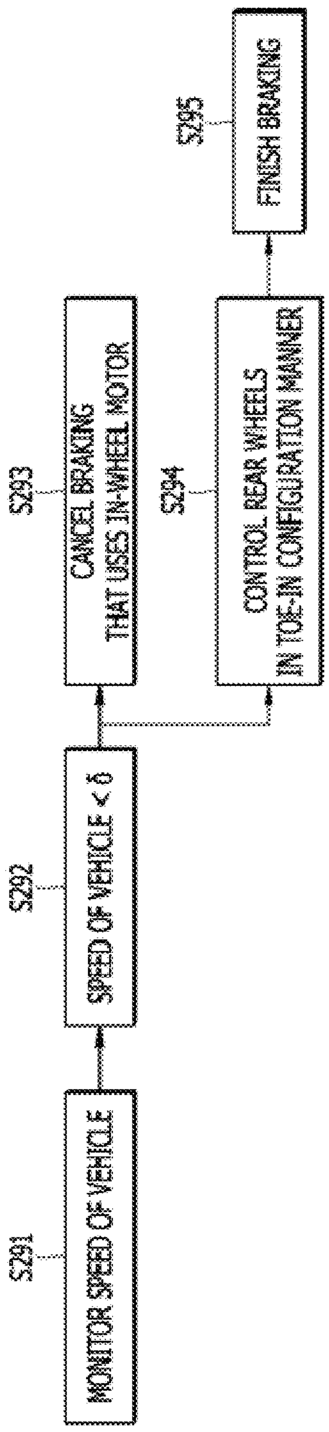
FIG. 12 is a flowchart illustrating the flow of data that occurs when the apparatus for controlling vehicular braking performs braking control using rear wheels, in the method according to the second embodiment of the present disclosure.

FIG. 12 is a flowchart illustrating the flow of data that occurs when the apparatus for controlling vehicular braking performs braking control using the rear wheels 23 and 24, in the method according to the second embodiment of the present disclosure.

With reference to FIG. 12, during braking, the processor 110 monitors a vehicular speed signal that is input from the vehicular speed sensor 141 (S291).

In a state where the electro-mechanical brake (EMB) 170 fails to operate, the speed of the vehicle 10 is reduced by braking the vehicle 10 using the in-wheel motor 180.

When braking reduces the speed of the vehicle 10 to lower than a first speed δ due (S292), the processor 110 cancels braking that uses the in-wheel motor 180 (S293). At this point, the first speed may be set to approximately 40 km/h or lower.

In a case where the in-wheel motor 180 generates the reverse torque, thereby performing braking, it is possible to perform braking until the vehicle comes to a stop. However, in a case where the in-wheel motor 180 is not precisely controlled in a low-speed section, a situation may occur where the in-wheel braking torque restricts the behavior of the vehicle 10.

Accordingly, when the vehicle 10 enters the low-speed section, the processor 110 stops braking using the in-wheel motor 180.

The processor 110 applies the control signal to the steering apparatuses of the third and fourth in-wheel modules 163 and 164 of the rear wheels 23 and 24, thereby causing the rear wheels 23 and 24 to attain the toe-in state. In a case where the rear wheels 23 and 24 attain the toe-in state, the braking force can be generated in a low speed of the vehicle 10.

The processor 110 can increase the braking force and can enhance the straight-line traveling using steering angles of the rear wheels 23 and 24 by controlling wheel angles of the rear wheels 23 and 24 in a toe-in configuration manner. Thus, the processor 110 can bring the vehicle 10 to a stop.

At this point, the processor 110 can control the four wheels 21 to 24 in a toe-in configuration manner. However, when performing this toe-in control, the traveling direction of the vehicle 10 may be limitedly controlled, thereby causing a problem in avoiding an obstacle. For this reason, it is preferred that the rear wheels 23 and 24 are controlled in a toe-in configuration manner.

Accordingly, the processor 110 can increase the braking force and can enhance the straight-line traveling using the steering angles of the rear wheels 23 and 24 by controlling the wheel angles of the rear wheels 23 and 24 in a toe-in configuration manner. Thus, the processor 110 can bring the vehicle 10 to a stop.

When the vehicle 10 comes to a complete stop, the processor 110 finishes braking (S295).

Therefore, although the electro-mechanical brake fails to operate in a vehicle capable of independently controlling four wheels, the apparatus for controlling vehicular braking and method according to the first and second embodiment of the present disclosure can effectively perform braking using in the in-wheel motor and can improve the safety of the vehicle.

What is claimed is:

1. An apparatus for controlling braking a vehicle, the apparatus comprising:
- an in-wheel motor installed in a wheel and configured to rotate the wheel;
- an electro-mechanical brake installed in the wheel and configured to perform braking;
- a vehicular speed sensor configured to measure a speed of the vehicle; and
- a processor configured to:
  - compute a required braking force in response to receiving a signal initiated by a brake pedal;
  - control braking by distributing the required braking force to the electro-mechanical brake and the in-wheel motor;
  - determine a braking state according to the speed of the vehicle and recompute a braking torque for the in-wheel motor; and
  - in case the electro-mechanical brake fails to operate, control the in-wheel motor to bring the vehicle to a stop, and, when the speed of the vehicle is lower than a preset speed, stop braking using the in-wheel motor and perform braking by controlling rear wheels of the vehicle in a toe-in configuration manner.

2. The apparatus of claim 1, wherein the processor is further configured to:
- when the signal is input from the brake pedal, check a state of charge (SOC) of a battery;
- in case the SOC of the battery is above a first setting value, control the electro-mechanical brake to perform the braking; and
- in case the SOC is at or below the first setting value, distribute the required braking force to the in-wheel motor and the electro-mechanical brake.

3. The apparatus of claim 1, wherein the processor is further configured to:
- in case the electro-mechanical brake fails to operate, determine, according to the signal from the brake pedal, whether sudden braking is required; and
- when sudden braking is required, control the in-wheel motor to operate at maximum braking torque.

4. The apparatus of claim 1, wherein the processor is further configured to:
- determine whether sudden braking is required when the electro-mechanical brake fails to operate;
- when sudden braking is not required, determine whether the vehicle is in a speed-reduced state based on the measured speed;
- maintain a braking torque of the in-wheel motor when the vehicle is in the speed-reduced state; and
- recompute the braking torque of the in-wheel motor when the vehicle is not in the speed-reduced state.

5. The apparatus of claim 1, wherein the preset speed corresponds to a low-speed section of the vehicle, and wherein the processor is further configured to perform braking by controlling rear wheels of the vehicle in the toe-in configuration manner to increase braking force and enhance straight-line stopping stability.

6. The apparatus of claim 1, wherein the processor is further configured to disperse and distribute the braking force to a plurality of the in-wheel motors and a plurality of the electro-mechanical brakes, based on the required braking force.

7. The apparatus of claim 2, wherein the processor is further configured to, in a case the brake signal is input and the SOC is above the first setting value, control the electro-mechanical brake to perform braking without controlling the in-wheel motor to perform braking.

8. The apparatus of claim 1, wherein the processor is further configured to control the in-wheel motor to generate reverse torque to perform braking.

9. A processor-implemented method of controlling braking of a vehicle, the method comprising:

computing a required braking force in response to receiving a signal initiated a brake pedal;

controlling braking by distributing the required braking force to an electro-mechanical brake and an in-wheel motor;

determining a braking state according to a speed of the vehicle in case the electro-mechanical brake fails to operate; and controlling the in-wheel motor by recomputing braking torque for the in-wheel motor according to the braking state, and, when the speed of the vehicle is lower than a preset speed, stopping braking that uses the in-wheel motor and performing braking by controlling rear wheels of the vehicle in a toe-in configuration manner.

10. The method of claim 9, wherein the controlling of the braking comprises:

controlling the braking using the electro-mechanical brake in case a state of charge (SOC) of a battery is above a first setting value, after checking the SOC of the battery when the signal is input from the brake pedal; and controlling the braking by distributing the required braking force to the in-wheel motor and the electro-mechanical brake in case the SOC of the battery is at or below the first setting value.

11. The method of claim 9, wherein the determining of the braking state comprises:

when the electro-mechanical brake fails to operate, determining, based on the signal from the brake pedal, whether sudden braking is required;

controlling the in-wheel motor to operate at a maximum braking torque when sudden braking is required; and when sudden braking is not required, determining whether the vehicle is in a speed-reduced state based on the speed of the vehicle.

12. The method of claim 11, wherein the determining of whether the vehicle is in the speed-reduced state comprises:

maintaining the braking torque of the in-wheel motor when the vehicle is in the speed-reduced state; and recomputing the braking torque of the in-wheel motor when the vehicle is not in the speed-reduced state.

13. The method of claim 9, wherein the preset speed corresponds to a low-speed section of the vehicle, and wherein the method further comprises performing braking by controlling rear wheels of the vehicle in the toe-in configuration manner to increase braking force and enhance straight-line stopping stability.

14. The method of claim 9, further comprising:

dispersing and distributing the braking force to a plurality of the in-wheel motors and a plurality of the electro-mechanical brakes, based on the required braking force.

15. The method of claim 9, further comprising:

in case the brake signal is input and the SOC is above the first setting value, controlling the electro-mechanical brake to perform braking without controlling the in-wheel motor to perform braking.

16. The method of claim 9, further comprising:

controlling the in-wheel motor to generate reverse torque to perform braking.

* * * * *